(12) United States Patent
Freund

(10) Patent No.: US 11,820,339 B2
(45) Date of Patent: Nov. 21, 2023

(54) BRAKE FLUID RESERVOIR WITH FILLING ADAPTER

(71) Applicant: ZF Active Safety GmbH, Koblenz (DE)

(72) Inventor: Christian Freund, Melsbach (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 17/844,973

(22) Filed: Jun. 21, 2022

(65) Prior Publication Data
US 2022/0410859 A1 Dec. 29, 2022

(30) Foreign Application Priority Data

Jun. 25, 2021 (DE) .......................... 102021206576.7

(51) Int. Cl.
| | |
|---|---|
| *B60T 11/26* | (2006.01) |
| *B60T 17/04* | (2006.01) |
| *B60T 17/06* | (2006.01) |

(52) U.S. Cl.
CPC ............. *B60T 11/26* (2013.01); *B60T 17/043* (2013.01); *B60T 17/06* (2013.01)

(58) Field of Classification Search
CPC ............................... B60T 17/222; B60T 11/22
See application file for complete search history.

(56) References Cited

U.S. PATENT DOCUMENTS

| | | | | |
|---|---|---|---|---|
| 2,746,253 | A | * | 5/1956 | Anderson ............... B60T 11/22 60/587 |
| 2,777,293 | A | * | 1/1957 | Hawkins ............... B60T 17/222 141/334 |
| 2,840,206 | A | * | 6/1958 | Logan ..................... F16D 37/02 192/21.5 |
| 6,298,961 | B1 | * | 10/2001 | Hageman ............... B60T 11/26 220/721 |

(Continued)

FOREIGN PATENT DOCUMENTS

| | | | |
|---|---|---|---|
| CN | 210971036 U | * | 7/2020 |
| DE | 1829892 U | | 4/1961 |
| DE | 4214768 A1 | | 11/1993 |

(Continued)

*Primary Examiner* — Melanie Torres Williams
(74) *Attorney, Agent, or Firm* — Kristin L. Murphy

(57) ABSTRACT

The present disclosure relates to a brake fluid device comprising a brake fluid reservoir having a storage space, having a fastening device for fastening to a pressure generator unit of a motor vehicle brake system and/or to a mounting interface in a motor vehicle. The brake fluid interface has an outlet interface for transporting brake fluid into such a pressure generator unit, and having an inlet interface (15) for brake fluid. The brake fluid device further includes a filling adapter having a filling opening, having a receiving space, and having an outlet interface for brake fluid. A brake fluid line connects the outlet interface of the filling adapter and the inlet interface of the brake fluid reservoir and through which brake fluid is able to flow from the filling adapter into the brake fluid reservoir. An air line extends through the brake fluid line in such a manner that one of its two line ends (Continued)

is located inside the receiving space of the filling adapter and the other line end is located inside the storage space of the brake fluid reservoir.

19 Claims, 1 Drawing Sheet

(56) References Cited

U.S. PATENT DOCUMENTS

2005/0109421 A1* 5/2005 Mitchell ............... B60T 17/222
141/59

FOREIGN PATENT DOCUMENTS

| DE | 60120608 T2 | 5/2007 | | |
|---|---|---|---|---|
| GB | 2308355 A | * | 6/1997 | ............ B60T 17/222 |
| WO | WO8300207 A1 | * | 1/1983 | |

* cited by examiner

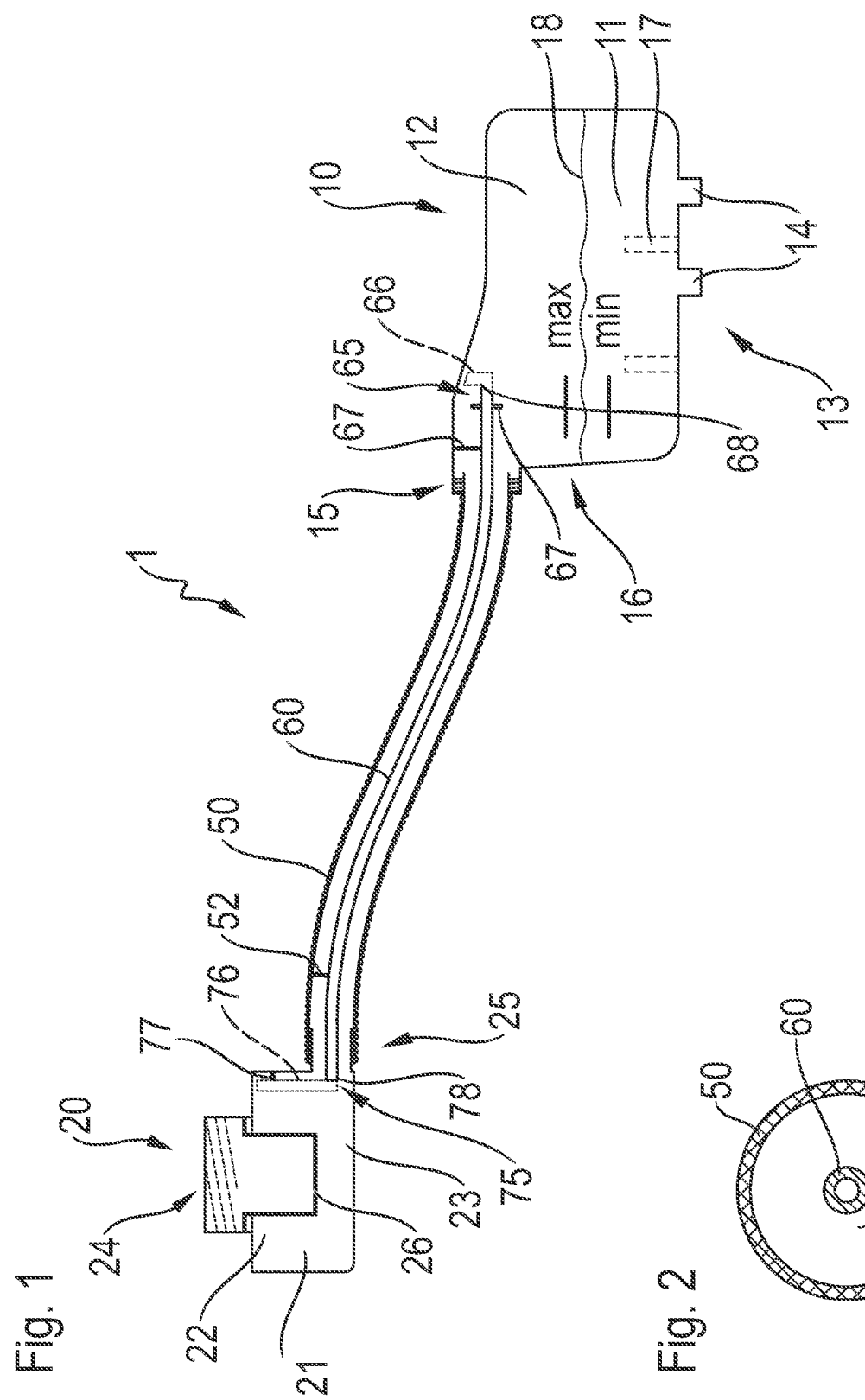
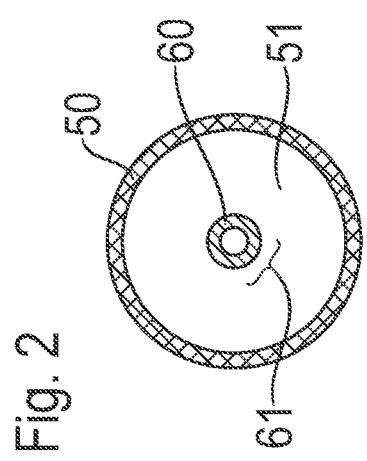

BRAKE FLUID RESERVOIR WITH FILLING ADAPTER

CROSS-REFERENCE TO RELATED APPLICATION

This application claims priority to German Priority Application No. 102021206576.7, filed Jun. 25, 2021, the disclosure of which is incorporated herein by reference in its entirety.

TECHNICAL FIELD

The disclosure relates to a brake fluid device for a motor vehicle, or for a brake system of a motor vehicle. The brake fluid device according to the disclosure represents a portion of such a brake system. It provides storage for brake fluid for the brake system and allows the possibility of filling the brake system with brake fluid.

BACKGROUND

In order to reliably supply the brake system with brake fluid, a brake fluid reservoir is conventionally fitted directly to the pressure generator of the brake system or arranged spatially in the vicinity thereof. Piston-cylinder units or pumps are used as pressure generators. Such a pressure generator is generally actuated directly or indirectly by the operator (main brake cylinder/sensor-based brake pedal simulator) or it is operated electrically in the case of brake control systems or redundant braking functions in the context of automated driving. In motor vehicles that are driven in an automated manner or autonomously, pressure generators are generally driven electrically.

Such pressure generators no longer have to be, and often also no longer can be, installed in a vehicle in such a manner that a brake fluid reservoir mounted on the pressure generator or in the vicinity thereof is accessible for servicing and can easily be filled with brake fluid. This is due essentially to the packaging (optimization of the installation space) in the vehicle, which has become generally challenging.

In such cases, as is disclosed in DE 601 20 608 T2 for example, a filling adapter is provided in addition to the brake fluid reservoir and is positioned in the vehicle so that it is accessible for filling. The filling adapter and the brake fluid reservoir are connected by a connecting line, so that the brake fluid that is poured in is able to flow from the filling adapter to the brake fluid reservoir. The filling adapter is in this case arranged higher than the brake fluid reservoir. However, filling the brake fluid reservoir without a vacuum filler (brake fluid is drawn into the brake system or into the brake fluid reservoir by suction) entails the problem that the brake fluid flows only slowly from the filling adapter into the brake fluid reservoir, since the air must escape from the brake fluid reservoir through the brake fluid line but is partially or intermittently prevented from doing so by the incoming brake fluid. As a result, filling of the brake fluid reservoir takes a long time, for example during servicing, when the brake fluid must be changed at regular intervals.

Accordingly, what is needed is to provide a brake fluid device which is easy to install and with which rapid and reliable filling of the brake system with brake fluid is possible.

SUMMARY

A brake fluid device according to the disclosure comprises a brake fluid reservoir, a filling adapter, and a brake fluid line. The brake fluid reservoir in turn has a storage space, a fastening device for fastening the brake fluid reservoir to a pressure generator unit of a motor vehicle brake system and/or to a mounting interface in a motor vehicle, an outlet interface for transporting brake fluid into such a pressure generator unit, and an inlet interface for brake fluid. The filling adapter has a filling opening, a receiving space, and an outlet interface for brake fluid. The brake fluid line connects the outlet interface of the filling adapter and the inlet interface of the brake fluid reservoir. Through the brake fluid line, brake fluid is able to flow from the filling adapter into the brake fluid reservoir.

An air line extends through the brake fluid line in such a manner that one of its two line ends is located inside the receiving space of the filling adapter and the other line end is located inside the storage space of the brake fluid reservoir. Venting of the brake fluid reservoir during filling is thus possible. The air located in the brake fluid reservoir is displaced by incoming brake fluid and is able to escape without difficulty through the air line and is not prevented from escaping by brake fluid. Brake fluid can accordingly be introduced quickly and reliably. The air line is integrated in the brake fluid line and forms a combination line. This combination line can be handled like one line and easily installed during installation.

In one exemplary arrangement, a cross section of the air line is smaller than a cross section of the brake fluid line, so that brake fluid is able to flow through the brake fluid line.

In one exemplary arrangement, a size ratio of the line internal cross section of the brake fluid line to the line external cross section of the air line is at least 2:1. That is to say, the line internal cross section of the brake fluid line is at least twice as large as the line external cross section of the air line. Such a configuration ensures that a sufficiently large flow cross section is provided for the brake fluid, so that the brake fluid is able to flow quickly. Because the viscosity of brake fluid is much higher than that of the gas air, the air line cross section can be designed to be much smaller compared to the brake line cross section.

In one exemplary arrangement, the size ratio of the line internal cross section of the brake fluid line to the line external cross section of the air line is at least 4:1. In a further exemplary arrangement, the size ratio is at least 10:1.

To ensure that no hydraulic fluid can enter the brake fluid line and that venting of the brake fluid reservoir functions properly, a maximum fill level of brake fluid is provided for the brake fluid reservoir, wherein air is present above the brake fluid level even when the storage space is filled up to that maximum fill level, and wherein the line end of the air line is located in this air region of the storage space.

The other line end of the air hose can advantageously also be arranged in an analogous manner in the filling adapter. For this purpose, the receiving space has a lower region, in which hydraulic fluid can collect during the filling process, and an upper region, in which no hydraulic fluid collects under normal conditions. The line end of the air line is in this case located in the upper region. The phrase "normal conditions" is to be understood as meaning a state in which the brake fluid level does not rise too high as a result of exceptional circumstances. This could occur, for example, if brake fluid was poured excessively quickly into the filling adapter.

In one exemplary arrangement, the line end of the air line has a bent line portion which projects into the air region of the storage space, and/or the line end of the air line has a bent line portion which projects into the upper region of the receiving space. In this exemplary arrangement, the inlet region and the outlet region of the air line thus each end in the respective air region, which facilitates problem-free venting of the brake fluid reservoir and thus filling of the brake system with brake fluid.

In order to prevent brake fluid from entering the air line and thus to ensure that air is able to flow unhindered through the air line, a drip element can be located at one of the two or at both air line ends.

Such a drip element can be fitted to the line end or the line ends as a circumferential ring, or such a ring can be formed integrally with the respective air line end. It can also be in the form of a projection or groove formed at the respective line end.

In one exemplary arrangement, a fixing device fixes the air line end against slipping and/or twisting within the storage space, and/or a fixing device fixes the air line end against slipping and/or twisting within the receiving space.

The air line can also be fixed against slipping and/or twisting relative to the brake fluid line by a fixing device.

The line end of the air line can be formed as part of the filling adapter. In this case, this line end is connected to the remainder of the air line in the region of the outlet interface of the filling adapter by a connecting device.

Likewise, the line end of the air line can be part of the brake fluid reservoir, wherein this line end is connected to the remainder of the air line in the region of the inlet interface of the brake fluid reservoir by a connecting device. It is thus likewise suitably ensured that the air inlet and the air outlet are located in the respective air region.

In order to simplify the installation of the combination line, the outlet interface and the connecting device can be of such a form that the outlet interface to the brake fluid line and the line end of the air line are aligned with one another so as to be connectable to the remainder of the air line and can be connected synchronously. Aligned with one another so as to be connectable means that, when the combination line is connected to the outlet interface, no special handgrips are necessary for connecting the brake fluid line in a sealing manner on, in or to the outlet interface and for connecting the remainder of the air line in a sealing manner on, in or to the air line end. Synchronously means that, when the combination line is connected to the filling adapter, both the brake fluid line and the air line are connected. This does not rule out the possibility that, for example as a result of a specific arrangement and form of sealing elements of the outlet interface of the filling adapter and of the connecting device of the air line, for example during a fitting process, first the connecting device of the air line and, as fitting is continued, then the outlet interface of the filling adapter seals with the brake fluid line. This exemplary arrangement contributes towards the ease of installation.

Correspondingly, the inlet interface of the brake fluid reservoir and the connecting device of the air line in the region of the inlet interface can be of such a form that the inlet interface to the brake fluid line and the line end of the air line are aligned with one another so as to be connectable to the remainder of the air line and can be connected synchronously.

Connection of the brake fluid line to the interfaces and of the air line to the air line ends can in each case be carried out by a plug connection, a screw connection or a combined plug and screw connection.

In the case of the integral arrangement of the line ends in the filling adapter and/or in the brake fluid reservoir, the line ends can in each case be integrally connected to the filling adapter and/or to the brake fluid reservoir in an inexpensive manner.

The ease of installation is facilitated if the brake fluid line and/or the air line is in the form of a hose at least in some portions.

In a further exemplary arrangement, the storage space of the brake fluid reservoir can be provided with fins, which prevent brake fluid from sloshing against the air line end.

BRIEF DESCRIPTION OF DRAWINGS

An exemplary arrangement of the disclosure and a modification of this exemplary arrangement will be explained hereinbelow with reference to the schematic illustrations of FIGS. 1 and 2:

FIG. 1 shows an exemplary arrangement of the brake fluid device according to the disclosure. A modification of this exemplary arrangement with a bent line portion at the air line ends is indicated by dotted lines; and FIG. 2 shows a cross-sectional representation of the combination line (brake fluid and air line).

DETAILED DESCRIPTION

The exemplary arrangement of a brake fluid device 1 according to the disclosure has as main components a brake fluid reservoir 10, a filling adapter 20, and a connecting line that includes a brake fluid line 50 with an air line 60 located on an inside thereof.

The brake fluid reservoir 10 is provided on its underside with a fastening device 13 for installation on a pressure generator of a motor vehicle brake system. The fastening device 13 is not shown in greater detail. One fastening option is fastening by the outlet interface 14, which in the present exemplary arrangement is formed by two outlet connections. Via the outlet connections, brake fluid is able to flow to and fro between the brake fluid reservoir and the pressure generator. The brake fluid reservoir 10 has a storage space 11, which is provided with fins 17. The brake fluid reservoir 10 is filled to about half with brake fluid. An air region 12 therefore forms in the storage space 11 above the brake fluid. On one side, the brake fluid reservoir 10 is provided at the top with an inlet interface 15 in the form of a pipe connection, via which brake fluid can be fed in.

The filling adapter 20 is installed in a motor vehicle at a higher level than the brake fluid reservoir 10. Therefore, it is also shown at a higher level in FIG. 1. The filling adapter 20 has a receiving space 21. On an upper side of the filling adapter 20 there is arranged a filling opening 24, which opens in the receiving space 21 via a filter 26. The filling adapter 20 with its filling opening 24 and its receiving space 21 performs the function of an interface for the operator, substantially according to a funnel principle, for introducing brake fluid into the brake system. On one side, in the lower region of the filling adapter 20, there is an outlet interface 25 in the form of a pipe connection, through which the brake fluid is able to flow into the brake fluid line 50 in the form of a hose, which connects the filling adapter 20 and the brake fluid reservoir 10 together. The brake fluid line 50 is fitted with its ends to the pipe connection of the outlet interface 25 of the filling adapter 20 and to the inlet interface 15 of the brake fluid reservoir 10.

An air line 60 in the form of a hose extends through the brake fluid line 50 and is fixed in the brake fluid line 50 by a fixing 52, not shown in greater detail. Since FIG. 1 shows both the form without bent line portions 66, 77 at the air line ends 68, 78 and the form with bent line portions 66, 77 illustrated by the dotted lines, the further description first refers to the form without bent line portions.

In this case, a line end 65 of the air line 60 projects horizontally into the air region 12 of the brake fluid reservoir 10. The line end 65 is provided with a drip ring 67. The line end 65 is further fixed to the inside wall of the storage space 11 by a fixing device 67, not shown in greater detail. On the filling adapter side, the other line end 75 of the air line 60 likewise projects horizontally into the filling adapter 20 slightly above the internal base of the filling adapter 20, so that there is sufficient distance between the internal base and the line end 75 that no brake fluid enters the air line 60 during the filling process.

In the modification likewise shown in FIG. 1 by dotted lines, both line ends 65, 75 of the air line 60 have a bent line portion 66, 76. In the brake fluid reservoir 10, the bent line portion 66 projects upwards in the storage space. In the filling adapter 20, the bent line portion 76 projects upwards in the receiving space 21. In both cases, the distance of the inlet openings of the air line ends from the brake fluid is thus increased and the risk that brake fluid will enter the air line 60 is reduced.

In FIG. 2, the combination line is shown in section. It can be seen that a cross section of the brake fluid line is larger than that of the air line, so that the flow of brake fluid and the flow of air are possible simultaneously and unhindered.

Alternatively, the brake fluid device 1 according to the disclosure in all the described exemplary arrangements can also be filled to such an extent that the fill level 18 rises up to the filling adapter 20. The brake fluid reservoir 10, the brake fluid line 50 and the air line 60 are thereby completely filled with brake fluid. This comes into consideration, for example, when the fill level in the brake fluid reservoir 10 cannot easily be checked visually because of its installation position in the motor vehicle. As a result of such complete filling, the fill level in the filling adapter 20 can be checked. The advantageous effect of the disclosure nevertheless comes fully to bear during filling of the brake system until the fill level 18 in the brake fluid reservoir 10 reaches the line end 65 of the air line 60. When such a completely filled brake fluid device 1 is emptied, the brake fluid runs out of the air line 60 again, so that venting via the air line 60 is made possible again when the reservoir is re-filled.

The invention claimed is:

1. A brake fluid device, comprising
    a brake fluid reservoir having a storage space, having a fastening device for fastening to a pressure generator unit of a motor vehicle brake system and/or to a mounting interface in a motor vehicle, having an outlet interface for transporting brake fluid into such a pressure generator unit, and having an inlet interface for brake fluid;
    a filling adapter having a filling opening, having a receiving space, and having an outlet interface for brake fluid;
    a brake fluid line which connects the outlet interface of the filling adapter and the inlet interface of the brake fluid reservoir and through which brake fluid is able to flow from the filling adapter into the brake fluid reservoir,
    wherein an air line extends through the brake fluid line in such a manner that one of its two line ends is located inside the receiving space of the filling adapter and the other line end is located inside the storage space of the brake fluid reservoir; and wherein a cross section of the airline is smaller than a cross-section of the brake fluid line so that brake fluid is able to flow through the brake fluid line.

2. The brake fluid device as claimed in claim 1, wherein a maximum fill level of brake fluid is provided for the brake fluid reservoir, wherein an air region is present above a brake fluid level even when the storage space is filled up to that maximum fill level, and wherein the other line end of the air line is located in this air region of the storage space.

3. The brake fluid device as claimed in claim 1, wherein the other line end of the air line has a bent line portion which projects into an air region of the storage space.

4. The brake fluid device as claimed in claim 1, wherein at one of the two or at both air line ends there is a drip element which in each case contributes to ensuring that no brake fluid enters the air line and that air is able to flow unhindered through the air line.

5. The brake fluid device as claimed in claim 1, wherein a fixing device fixes the other air line end against slipping and/or twisting within the storage space.

6. The brake fluid device as claimed in claim 1, wherein the line end of the air line is part of the filling adapter, and the line end is connected to a remainder of the air line in a region of the outlet interface by a connecting device.

7. The brake fluid device as claimed in claim 6,
    wherein the line end of the air line and the filling adapter or part of the filling adapter are integrally connected to one another, and/or
    wherein the other line end of the air line and the brake fluid reservoir or part of the brake fluid reservoir are integrally connected to one another.

8. The brake fluid device as claimed in claim 1, wherein the brake fluid line and/or the air line is in the form of a hose at least in some portions.

9. The brake fluid device as claimed in claim 1, wherein a size ratio of a line internal cross section of the brake fluid line to a line external cross section of the air line is at least 2:1.

10. The brake fluid device as claimed in claim 1, wherein the size ratio if the line internal cross section of the brake fluid line to the line external cross section of the air line is at least 4:1.

11. The brake fluid device as claimed in claim 1, wherein the size ratio if the line internal cross section of the brake fluid line to the line external cross section of the air line is at least 10:1.

12. The brake fluid device as claimed in claim 2, wherein the receiving space has a lower region, in which hydraulic fluid can collect during a filling process, and an upper region, in which no hydraulic fluid collects under normal conditions, and wherein the line end of the air line is located in the upper region of the receiving space.

13. The brake fluid device as claimed in claim 1, wherein the receiving space has a lower region, in which hydraulic fluid can collect during a filling process, and an upper region, in which no hydraulic fluid collects under normal conditions, and wherein the line end of the air line is located in the upper region of the receiving space.

14. The brake fluid device as claimed in claim 3, wherein the line end of the air line has a bent line portion which projects into the upper region of the receiving space.

15. The brake fluid device as claimed in claim 1, wherein the line end of the air line has a bent line portion which projects into an upper region of the receiving space.

16. The brake fluid device as claimed in claim 1, wherein a fixing device fixes the air line end against slipping and/or twisting within the receiving space.

17. The brake fluid device as claimed in claim 1, wherein a fixing device fixes the air line against slipping and/or twisting relative to the brake fluid line.

18. The brake fluid device as claimed in claim 6, wherein the other line end of the air line is part of the brake fluid reservoir, and the line end is connected to the remainder of the air line in a region of the inlet interface by a connecting device.

19. The brake fluid device as claimed in claim 18,
wherein the outlet interface and the connecting device are of such a form that the outlet interface to the brake fluid line and the line end of the air line are aligned with one another so as to be connectable to the remainder of the air line and can be connected synchronously, and/or
wherein the inlet interface and the connecting device are of such a form that the inlet interface to the brake fluid line and the line end of the air line are aligned with one another so as to be connectable to the remainder of the air line and can be connected synchronously.

* * * * *